Nov. 7, 1933.  F. C. HOLTZ ET AL  1,933,591
MOTOR
Filed Jan. 19, 1931  3 Sheets-Sheet 1

Inventors:
Frederick C. Holtz
Fred Kurz
By Brown, Jackson, Boettcher & Dienner
Attys.

Nov. 7, 1933.  F. C. HOLTZ ET AL  1,933,591
MOTOR
Filed Jan. 19, 1931  3 Sheets-Sheet 2

Inventors:
Frederick C. Holtz
Fred Kurz
By Brown, Jackson, Boettcher & Dienner.
Attys.

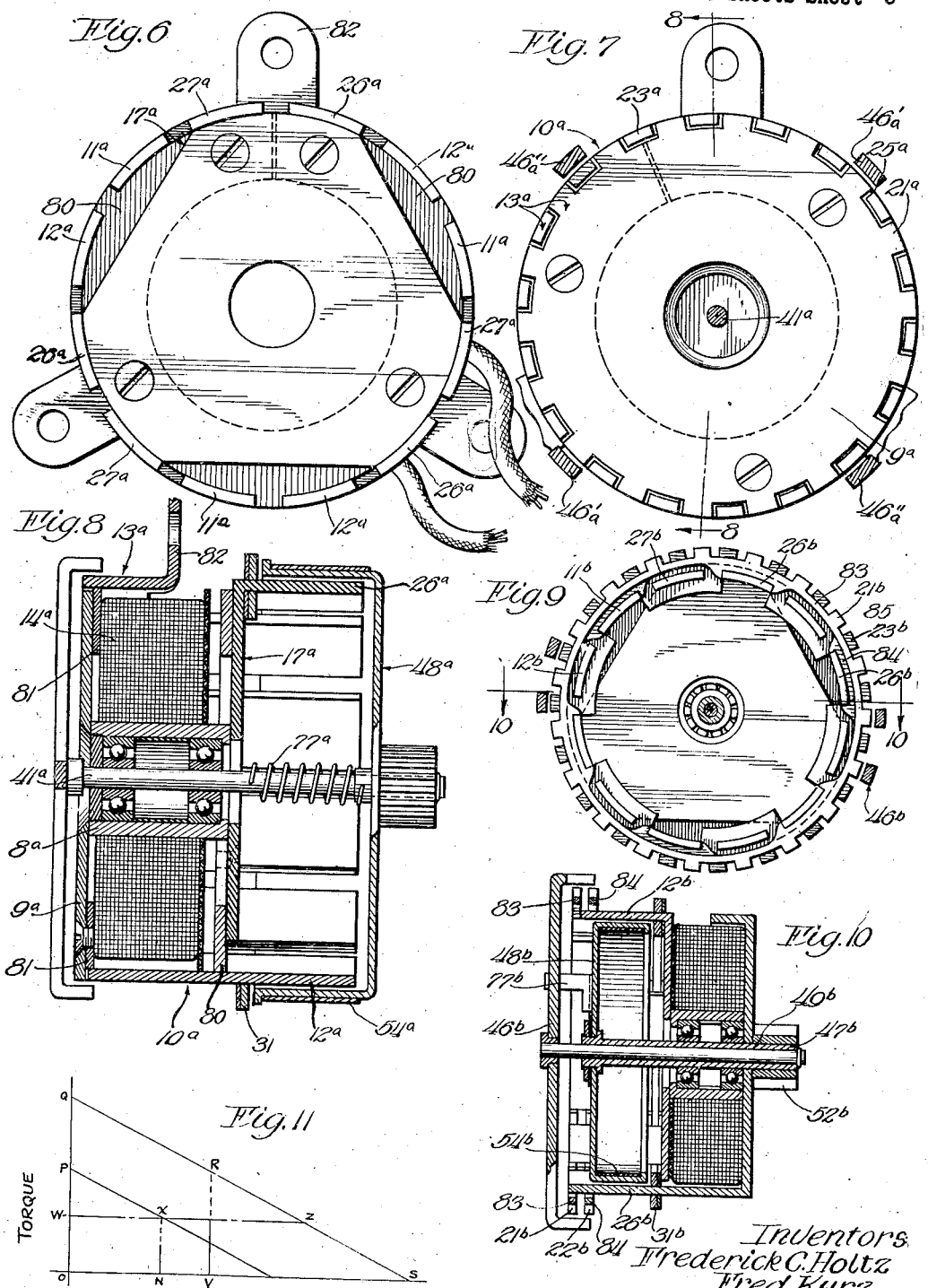

Patented Nov. 7, 1933

1,933,591

UNITED STATES PATENT OFFICE 1,933,591

MOTOR

Frederick C. Holtz and Fred Kurz, Springfield, Ill., assignors to Sangamo Electric Company, Springfield, Ill., a corporation of Illinois Application January 19, 1931. Serial No. 509,564

25 Claims. (Cl. 172—275)

This invention relates to electric motors and more particularly to a motor adapted to operate at uniform speed proportionate to the frequency of an alternating current circuit.

It is a general object of the present invention to provide a novel and improved form of alternating current motor particularly adapted for driving the mechanism of clocks, demand registers, or similar devices.

Another object of the invention consists in providing an improved and simplified synchronous motor having self-starting characteristics.

More particularly it is an object of the invention to provide in an alternating current motor of the above type a novel stator and rotor structure adapted to produce a relatively high torque both during starting and while running at synchronous speed.

Another object of the invention is to provide a relatively small synchronous motor of comparatively simple and inexpensive construction, which is rugged and compact, which has a low synchronous speed, and in which the torque per watt input is high.

Still another object of the invention consists in providing a motor of this character in which the stresses in the rotor are balanced, thus eliminating noise due to vibration and producing a motor which is noiseless, or practically noiseless, in operation.

Another object of the invention is to provide an alternating current motor wherein the rotor comprises an induction element and a permanently magnetized element.

Another object is to provide an alternating current motor wherein the stator comprises different portions establishing at one point a rotating or shifting flux field and establishing at another point an alternating flux field. The rotating or shifting flux field cooperates with the induction element of the rotor for starting the motor and for creating and maintaining a relatively high torque at the normal or synchronous speed; and the alternating flux field cooperates with the permanently magnetized element of the rotor for maintaining the rotor in synchronism with the impressed current. In this regard it is another object of the invention to provide such a stator structure in which the fluxes of both the rotating field and of the alternating field are generated by a common magneto motive force.

Another object in this regard is to provide an improved construction in which the rotating flux field and the alternating flux field are in series relation in the magnetic circuit of the stator.

Another object of the invention is to provide a motor of the above type wherein the permanently magnetized element of the rotor revolves in exact synchronism with the alternating field of the stator but wherein the induction element of the rotor, in revolving at this same speed, is rotating at a subsynchronous speed with respect to the rotating field of the stator. In this regard, an important feature of the invention resides in the provision, in the magnetic circuit of the stator, of a plurality of air gaps arranged to provide a plurality of sets of poles, one of which sets has a lesser number of poles than the other, whereby the speed of rotation of the rotating field is greater than the synchronous speed at which the alternating field holds the permanently magnetized element of the rotor. Because of the considerable degree of "slip" constantly maintained between the rotating flux field revolving at a relatively high speed and the induction element of the rotor revolving at a considerable lower speed, the induction element of the rotor has a relatively high torque maintained therein at the desired synchronous speed of the motor. This torque of the induction element of the rotor is so proportioned, however, that it cannot pull the permanently magnetized element of the rotor to a speed higher than the synchronous speed of said magnetized element.

A further important feature of the invention resides in the provision of a structure in which the above mentioned parts are interrelated and nested in such a manner as to occupy the least possible amount of space.

Other and further features and objects of the invention will be more apparent to those skilled in the art upon a consideration of the accompanying drawings and the following specification, wherein is disclosed an exemplary embodiment of the invention with the understanding, however, that such changes may be made therein as fall within the scope of the appended claims without departing from the spirit of the invention.

Figure 5:
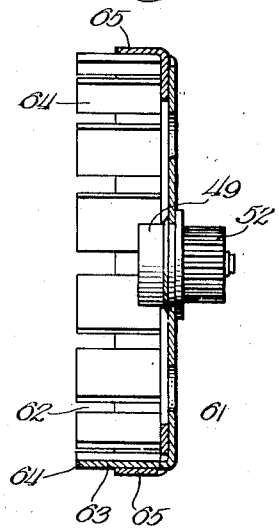

Figure 5 is a view in section of a rotor built according to another embodiment of the invention;

Figure 6 is an end elevational view of a stator built according to another modification of the invention;

Figure 7 is an end elevational view of the stator shown in Figure 6, taken from the opposite end;

Figure 8 is a sectional view taken approximately along the line 8—8 of Figure 7, of a modified form of motor which utilizes the stator shown in Figures 6 and 7;

Figure 9 is an end elevational view of a stator built according to still another embodiment of the invention;

Figure 10 is a sectional view of another modified form of motor which utilizes the stator shown in Figure 9; and Figure 11 is a graphical representation of the speed-torque relation of motors built according to our invention.

The present invention deals particularly with alternating current motors of the so-called "clock" type wherein the stator comprises a magnetic core and extensions of the core arranged in side-by-side annular relation to form a set of poles and, as previously remarked, the invention is characterized by the use of a rotor having an induction element and a permanently magnetized element each cooperating with an independent portion of the same stator structure, both of which portions are energized by a common magneto-motive force. While the invention is particularly shown and described in an embodiment of such a motor adapted to drive a clock mechanism, a demand meter or the like, it is apparent that the structure or parts thereof may be used or modified, as desired, for other uses.

Figure 1:
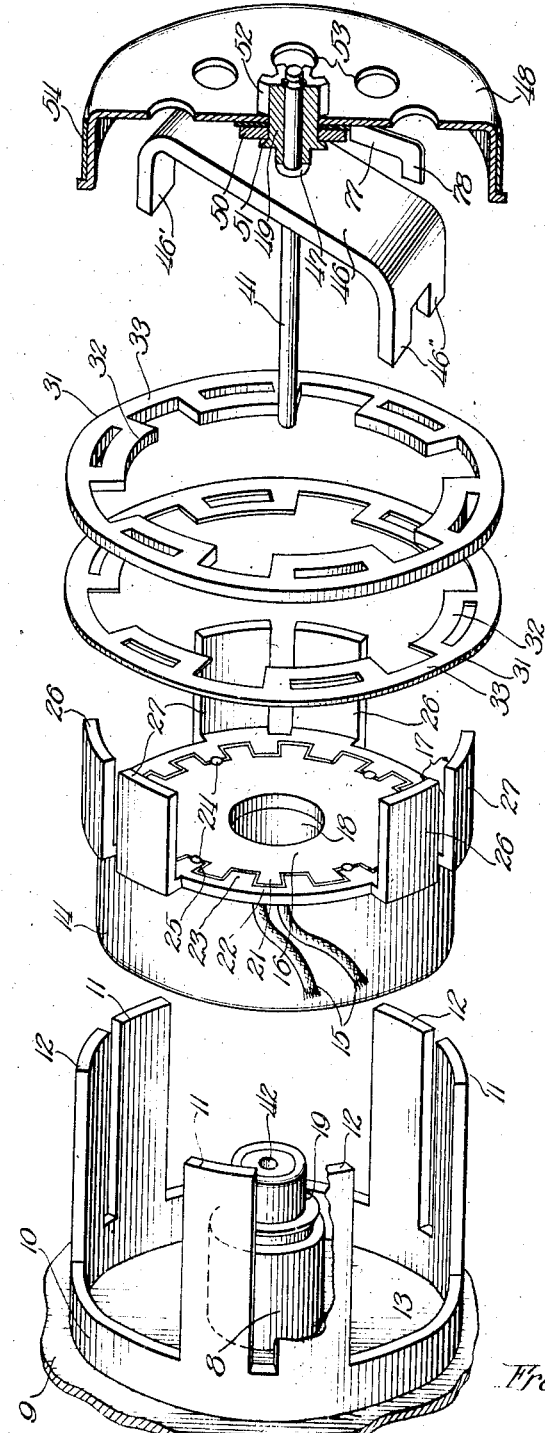
Figure 1 is a view in perspective, in exploded relation, of the parts of a motor built according to this invention.
Figure 2:
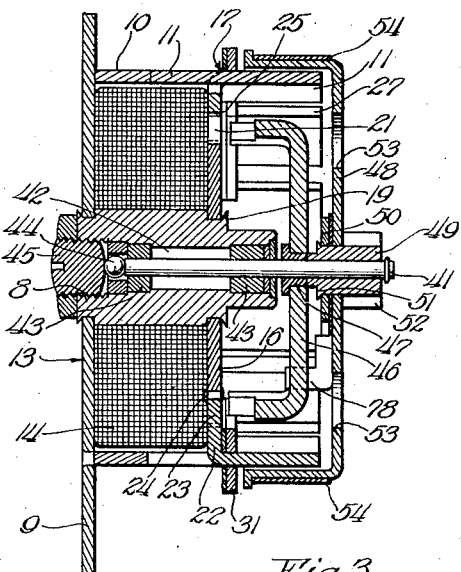
Figure 2 is a view in section of a motor assembled from the parts shown in Figure 1, according to one embodiment of the invention.
Figure 3:
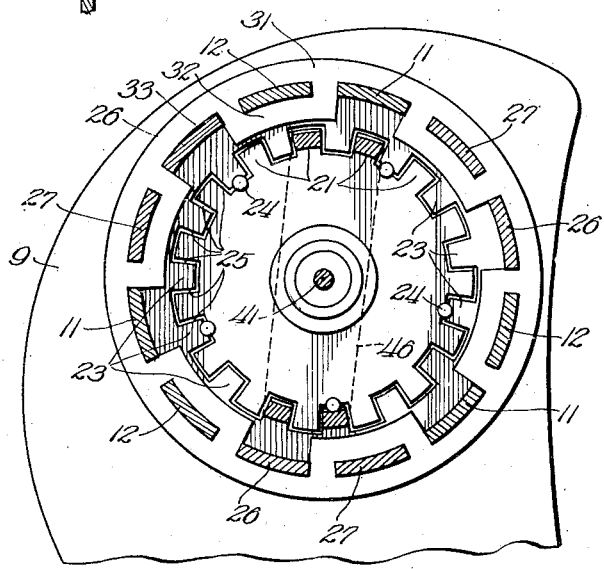
Figure 3 is an end view partly in section, of the stator structure of the motor shown in Figures 1 and 2.

Referring now to the drawings for a more complete disclosure of this invention, and particularly to Figures 1, 2 and 3 thereof, there is shown at 8 a cylindrical, suitably-flanged, magnetic core at one end of which an end bell or plate 9 is secured. The plate may be shaped and drilled in such a manner as to furnish a base for mounting the motor in a clock, a meter, an instrument case or the like, as desired. The end plate, of course, is also of magnetic material. A cylinder 10 of magnetic material is fastened to the end bell 9 by riveting, spot welding or the like and portions of the cylinder are cut away or slotted in alternate wide and narrow slots so that the remaining projections of the cylinder will constitute a plurality of teeth or poles 11 and 12 preferably arranged in pairs and spaced at intervals about the cylinder for a purpose to be hereinafter explained.

There may be any desired number of teeth on the cylindrical member according to the number of poles desired. The end plate and the cylindrical member may be said to constitute a cup-like extension 13 of the magnetic core 8, and if desired the plate 9 and the cylindrical member 10 may be of one piece.

An annular coil 14 is so proportioned that it will encircle the core 8 and may be disposed within the cup member. The coil is helically and spirally wound and in motors for driving electric clocks, the reactance of the coil is sufficient to prevent any great flow of electric current through it. Electrical connection with a source of alternating current may be made through the conductors 15.

A disc 16 of magnetic material is provided with a central opening 18 such that the disc will closely engage a flange 19 at the other end of the magnetic core 8 from the plate 9. The periphery of the disc is provided with a ring of outwardly projecting rectangular teeth 21. An annulus 22 is provided with a ring of inwardly projecting teeth 23 adapted to fit into and coact with the outwardly projecting teeth 21 of the disc 16 and to be secured thereto in spaced relation by any suitable fastening means such as the nonmagnetic rivets 24, which are anchored in the space between the teeth on the disc 16 and the teeth on the annulus 22. The disc 16 and the series of teeth 21 thereon always have the same flux polarity as the right hand end of the core 8 on which the disc is mounted, whereas the teeth 23 on the annulus 22 always have the flux polarity of the other end of the core through a flux path including the cup shaped member 13 which flux path we shall later describe. The coacting teeth of the disc and annulus are spaced from each other to constitute a substantially circular air gap 25 of tooth-like conformation extending around the entire circle of the coacting nested rings of alternating polar teeth so that when a potential is applied to the coil a magnetic field is set up at the gap and the coacting teeth will form poles of opposite polarity. It will be noted that, when an alternating current is applied to the coil, at any given moment the magnetic flux in the teeth 21 will all be of one given magnetic polarity and the teeth 23 of the other. It will be apparent also that during the next half cycle of the alternating current power supply, the teeth 23 will be of the same magnetic polarity as the teeth 21 were previously and the teeth 21 of the opposite polarity. Thus the flux spanning the gap 25 is an alternating field between teeth or poles of alternating polarity. This field and set of poles may be termed the inner or alternating flux field and the inner set of poles, to distinguish them from an outer or rotating flux field and an outer set of poles hereinafter described.

The annulus 22 is provided with an axially extending flange which is slotted with wide and narrow slots to constitute a plurality of axially extending projections or poles 26 and 27 arranged in pairs and spaced at intervals about the periphery of the annulus in such a manner that the extension 17 formed by the disc and annulus nests within the extension 13, comprising plate 9 and cylinder 10, extending from the opposite end of core 8, and the pairs of poles 26 and 27 are located between the pairs of poles 11 and 12. The poles 11 and 12, 26 and 27, when assembled as indicated, are preferably equally spaced to constitute a ring of poles located in side by side relation about a circle so that when energized the poles form a field which may be termed the outer or shifting field.

It is apparent also that when the alternating electromotive force is applied to the coil 14 that at any given moment flux in core 8 and the two extensions 13 and 17 of the core will cause the poles 11 and 12 and the poles 26 and 27 to become poles of opposite magnetic polarity. It is apparent also that the poles 11 and 12 and 26 and 27 will change their polarity during the next half cycle of the power supply. In order to provide a shifting magnetic field about each pair of poles, lag plates 31 are provided having loops 32 which are arranged to surround alternate outer poles. The plates 31 are of copper or other suitable electrically-conducting material and since they entirely surround the alternate poles they will create a phase lag which causes the flux in the poles so equipped to lag behind the flux in the adjacent poles thus setting up a shifting or substantially rotating magnetic field around the ring of poles, suitable for driving an inductor rotor element responding to this rotating magnetic field.

It is clear that the washer-like portion 33 of the lag plate 31 has as its primary purpose to hold the loops 32 in a single assembly or unit and that separate or other suitable forms of shading coils may be used. It is apparent also that if the loops are placed on the poles 12 and 27 the rotor will turn in one direction and if they are placed on poles 11 and 26 the rotor will turn in the other direction.

Figure 4:
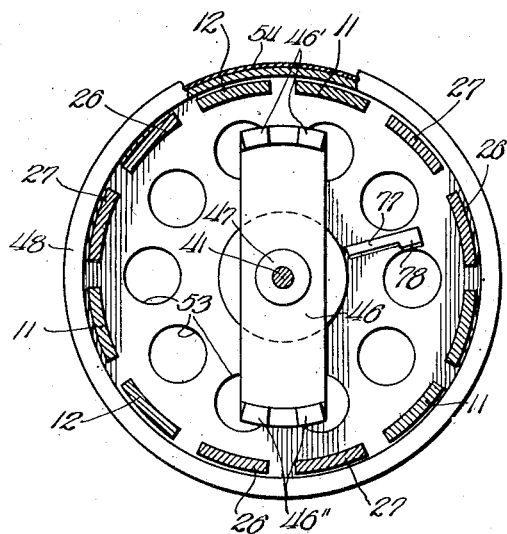
Figure 4 is an end view partly in elevation and partly in section of the motor shown in Figures 1 and 2, and illustrating the rotor in greater detail.

The spaces between the pole portions 11—12 and 26—27 of opposite polarity constitute portions of a substantially circular air gap, best observed from Figs. 3 and 4. It is in this air gap that the rotating magnetic field is established which creates starting and running torque in the inductor element of the rotor which we shall presently describe. This latter air gap and its rotating magnetic field are in series relation with the first mentioned air gap 25 and its alternating magnetic field through that portion of the magnetic circuit extending from the end plate 9 at one end of the core 8 to the end disc 16 at the opposite end of said core.

Therefore, the stator shown and described may be said to have two gaps or magnetic fields in series relation energized by the same magnetomotive force. In this modification both fields are located at one end of the stator. Another embodiment of the invention utilizing two gaps or fields in series relation with one field at one end of the stator and the other at the other end of the stator is shown in Figures 6, 7 and 8, and is hereinafter described. Still another embodiment, utilizing two gaps or fields in parallel relation is shown in Figures 9 and 10 and is also hereinafter described. It is apparent therefore that the invention contemplates the use of a stator having two or more magnetic fields in series or parallel relation or in a combination of the two and energized by the same magnetomotive force and that the fields may be located at different points or combinations of points in the magnetic circuit.

The rotor of the motor comprises two elements rotatably mounted with respect to the stator having a limited rotative movement with respect to each other. If desired, however, the two elements of the rotor may be secured together as one unit, but are preferably flexibly or frictionally engaged with each other as hereinafter explained.

The elements are mounted upon a shaft 41 which is rotatably mounted in the central bore 42 of the magnetic core 8. Any suitable bearing structure may be employed, but a preferred structure comprises spaced bearing rings 43 and a ball thrust bearing 44 which may be adjusted in and out with relation to the core 8 by means of the threaded screw 45.

One of the rotor elements preferably comprises a U-shaped permanent or bar magnet 46 having notched or slotted ends to comprise a pair of teeth or poles 46′ and 46″ at each end of the magnet, one pair 46′ being of one polarity and the other pair 46″ being of the other polarity. Each tooth or pole 46′ and 46″ is preferably of substantially the same width as the teeth 21 and 23 over which the magnet 46 rotates and the slot between each pair of teeth 46′ and 46″ is preferably of substantially the same width as a tooth 21 plus twice the width of the air gap between adjacent teeth, so that if, for instance, one tooth 46′ is over an inner tooth 21, the other tooth 46′ will be over a successive inner tooth 21 and the slot between the poles 46′ spans the outer tooth 23 located between the successive inner teeth 21. If the teeth 21 are assumed to be odd in number and the magnet 46 is located on the diameter of the circle formed by teeth 21, and if the poles 46′ are over two successive inner teeth 21 the poles 46″ at the other end of the magnet 46 will be over the outer teeth 23; or if the poles 46′ are over two successive outer teeth 23 the other ends 46″ are over two successive inner teeth 21.

If an alternating electromotive force is applied to the coil 14 the teeth 21 and 23 will become poles of opposite polarity by reason of the air gap between them, and because the charging electromotive force is alternating the poles 21 and 23 will change their polarity, the change being in accordance with and in response to the flow of the alternating current. This results in what may be termed an alternating field at the teeth 21 and 23 and since the poles of the magnet 46 are permanently north and south, if the magnet is started rotating at substantially the apparent synchronous speed of rotation of the field at teeth 21 and 23 its poles will be successively attracted and repelled by the successive poles of the alternating field to maintain synchronous speed. The magnet is preferably secured to a non-magnetic hub 47 on the shaft 41 and rotates with it. The non-magnetic hub, usually of brass or the like, limits flux leakage through the bar magnet to the shaft and through the shaft to the core 8.

The other element of the rotor is preferably composed of a cup-shaped induction member 48 mounted upon a suitable bearing 49 on the shaft 41. Preferably the induction member 48 is rotatably mounted on the bearing 49 with a spring arm or spring means connecting this induction member with the permanent magnet 46, as we shall hereinafter describe, although the two might be rigidly secured together. The inductor element 48 is spaced from the permanent magnet by means of washers 50 which are held in place by means of a flange 51 on the bearing. A small spur gear 52 or other driving element is secured to or formed on the bearing 49 on the shaft 41 for the purpose of driving the mechanism of the clocks, demand meters or other driven devices.

A preferred embodiment of the inductor element is in the form of a cup-like member of copper or similar electrically conducting but non-magnetic material. The cup may be provided with openings 53 for the purpose of furnishing ventilation to the motor and to reduce the weight of the rotating parts. A magnetic band 54 of steel or iron is preferably engaged on the outside flange of the cup-like member for the purpose of furnishing a path by means of which the magnetic flux from the poles 11 and 12, 26 and 27 of the stator may flow from one pole to the other. The band likewise serves the purpose of directing the flow of flux so that it will pass through the copper of the inductor element to drive it in the well known manner. If desired the band 54 may be eliminated and the cup-shaped member may be of magnetic material such as hardened steel or the like. An induction and/or hysteresis element of this type has a somewhat lower torque than the element just described but a much higher free running speed.

In another embodiment of the invention illustrated in Figure 5 the rotor structure includes a steel cup-shaped induction member 61 having slots 62 in the peripheral flange 63 thereof to provide teeth or poles 64 separated by a suitable air gap. The number of poles is considerably greater than the number of poles in the stator with which it cooperates, and they are always chosen to be odd in number in order to avoid any tendency toward locking at standstill. One or more annular bands or punchings 65 comprising a washer-like portion and a cylindrical flange at right angles to the washer-like portion and made of copper or other electrically conducting material are placed on the outer side of the flange 63 of the cup-like member and are provided with circumferentially extending openings or slots at the corner where the flange joins the washer-like portion in order that they may be secured to the cup-shaped member by placing them on the teeth 64. These bands give rise to the induction motor torque when used with the stator hereinbefore described. Such rotors have, in general, a high standstill torque and also an inherently high running speed thereby furnishing considerable torque to the rotor in starting and running.

The operation of the device is as follows:

When an alternating electromotive force is impressed on the coil 14 a magnetic field is set up which alternately magnetizes the poles 11 and 12 and 26 and 27 as north and south poles in accordance with the direction of flow of the current in the coil 14. The flux path, during one half cycle, is from the core 8 through the end bell 9, the cylinder 10, poles 11 and 12, across the gap at the ends of these poles, into and through the band 54 or other magnetic portions of the induction portion of the rotor, back to poles 26 and 27, through the annulus 22, across the gap between teeth 21 and 23, through the disc 16 and back into the core 8. During the other half cycle of course the direction is reversed. The air gap 25 on the core extension 17 causes the magnetic field to arch out over the gap to a sufficient extent to provide a relatively strong field at this point which is available to rotate the permanent magnet after it has attained synchronous speed. It is apparent that when the magnet has been brought up to proper speed, its speed of rotation will be in proportion to the frequency of alternation of the supply line current. The number of the teeth 21 and 23 passed over by the magnet in one revolution is preferably considerably greater than the number of poles 11 and 12 and 26 and 27. It is apparent then that when the magnet 46 is moving over the teeth 21 and 23 at a given speed, the inductor element 48 will tend to rotate at a much greater speed because the apparent speed of rotation of the magnetic field in the poles 11 and 12 and 26 and 27 is considerably greater than the apparent speed of rotation of the field at the poles 21 and 23.

In the present instance we have shown a stator construction utilizing fifteen pairs of teeth for rotating the permanent magnet and only three sets of oppositely magnetized poles for rotating the inductor element. It is apparent therefore that the synchronous speed of the alternating field at the inner poles will be one-fifteenth of the number of current alternations in the coil 14 during any given period of time. The synchronous speed of the rotating flux field at the outside poles is only one-third of the frequency of alternations of the applied electromotive force. Therefore, the inductor element will tend to rotate at a speed five times as great as the speed of the permanent magnet or other synchronous member. Since, however, the cup-like member is an induction element, it must necessarily lag the apparent speed of rotation of the outside poles in order that there may be sufficient slip to generate eddy currents within the copper of the inductor portion of the rotor. The number and location of the two sets of poles and their ratio may be chosen so as to secure any desired relation of apparent synchronous speeds of the two sets of poles.

The magnetic element and the inductor element may be secured rigidly together or pinned loosely together in a relative position considered most suitable for generating the most desirable torque or they may be operatively connected by a resilient lost motion connection established as by means of the spring 77 which may be fastened to the inductor element and have a projection 78 adapted to engage the edge of the magnet. The spring 77 may be advantageous in some constructions for preventing the accelerating forces and the inertia of the rotor in approaching synchronous speed from jerking the permanent magnet through and beyond the synchronous speed of the magnetic element. However, this resilient characteristic is not essential, as a successfully operating construction can be made wherein a moderate amount of lost motion is permitted between the magnetic and inductor elements of the rotor, with the limits of this lost motion defined by positive, non-resilient stops.

It is apparent, too, that if desired, the inner poles may be located at the other end of the coil 14, in the core extension 13, with the shaft 41 projecting entirely through the core to the other side where the permanent magnet may then be secured thereto. This structure is shown in Figures 6, 7 and 8. The extension 17a corresponds to the disc 16 and annulus 22 of the structure previously described, but the air gap 25 has been eliminated and the extension is of one piece. The air gap 25a is located in the other cup-shaped extension 13a and is preferably formed of the disc 9a which is provided with teeth 21a at its periphery and the cylinder 10a which is provided with transversely extending teeth 23a which alternate with the teeth 21a to form the alternating magnetic field. This magnetic field is preferably employed in the same manner as the inner field of the motor previously described to maintain rotation of a permanent magnet 46a preferably having inwardly bent ends which extend axially over the ends of the teeth. In the modification shown a stator having an even number of teeth 21a and 23a and a magnet having four poles 46a′ and 46a″ of alternate polarity spaced at 90° are employed and the width of each pole is substantially the same as the width of the teeth 21a and 23a. It will be noted that when two poles of the same polarity, as the poles 46a′, are over one set of teeth, say the teeth 21a, the other poles 46a″ will be over the teeth 23a, and consequently the operation of this type of magnetic rotor is substantially the same. Other suitable tooth and pole combinations may be employed. The inductor element 48a may be of any desired construction but is preferably rotatably mounted on the shaft 41a, and may be attached thereto by means of the previously described spring finger or by a coil spring 77a. The inner cup-shaped core extension 17a is preferably spaced away from the coil 14a by means of a plate 80 of non-magnetic material such as brass. The outer extension 9a is spaced from cylinder 10a by a plate 81 in the same manner. It is to be noted that the two magnetic fields are in series relation in this modification since the flux from the core 8a flows through the disc 9a, across the gap 25a, through the cylinder 10a, across the gap at the ends of the poles 11a and 12a to the band 54a, back to poles 26a and 27a and back to the core 8a. The lugs 82 of the core extension 13a afford means for securing the motor to the instrument or device with which it is to be used.

The poles 11a and 12a are extensions of the cup-shaped member 13a and the poles 26a and 27a are extensions of the triangular cup-shaped member 17a in substantially the same manner as the poles 11 and 12, 26 and 27 previously described were extensions of the cup-shaped members 13 and 17, respectively. The shading coils 31 are also of the same construction and arranged in the same manner as before.

In another embodiment of the invention, shown in Figures 9 and 10, the magnetic fields which drive the permanent magnet 46b and inductor element 48b may be said to be in parallel relation since the poles for driving the permanent magnet comprise rings 83 and 84 which are mounted by means of slots 85 in their inner peripheries, on the respective sets of poles 11b and 26b or 12b and 27b. The rings are spaced apart and are provided with teeth 21b and 23b at their outer periphery arranged in alternate or staggered relation. At any given instant in operation one set of teeth constitute a set of poles of one polarity and the other set are of the opposite polarity. The permanent magnet 46b is substantially the same as the magnet 46a previously described except that it is a trifle longer and extends inwardly a trifle further to extend over the teeth 21b and 23b. In the construction shown in Figures 9 and 10 the large poles 11b, 12b, 26b and 27b, which were formerly the outer poles, are of the same construction previously described but the cup-shaped inductor rotor 48b is located inside of the poles and the steel band 54b which is preferably used, is located inside the cup member 48b to cause the flux to pass through the non-magnetic cup. Of course other types of inductor elements may be used. The lag plates or shading coils 31b which may be of the same construction as the coils 31 previously described, are placed on every other pole and serve substantially the same purpose in providing a shifting field for the rotor induction element. The rings 83 and 84 may be placed on either the lagged or unlagged poles, but are preferably placed on the unlagged poles. The bearing 49b upon which the inductor rotor is mounted may extend to the other side of the coil where a gear 52b is fastened to it or may extend through the permanent magnet to provide a mounting for the gear and a bearing for the rotor, or the permanent magnet may have the gear secured to it. Connection between the two parts of the rotor may be made by the flexible spring 77b shown or by any other suitable means.

With regard to coupling the inductor element and the permanent magnet together with a flexible coupling, reference may be had to Figure 11 in which the speed of rotation of the rotor is indicated in horizontal components and the torque in vertical components. Let the line PU represent the maximum permissible speed-torque curve of the inductor element alone, under an operating condition where the two elements are rigidly coupled together. If the induction torque VT available at synchronous speed is greater than a certain portion of the synchronous torque, the induction element will carry the magnetic element above synchronous speed and of course the usefulness of the motor for driving a clock mechanism or similar device is destroyed.

Let the line VR represent the synchronous speed of the permanent magnet element and the line WZ represent the torque required under certain abnormal or heavy duty conditions to overcome friction and pick up and carry the load imposed on the motor.

It is apparent by inspection that under these abnormal or heavy duty conditions the rotor will only reach a speed represented by the line ON and will never reach synchronous speed.

If, however, the spring 77 or any other frictional or flexible coupling member, or lost motion connection, as hereinbefore described is utilized, an inductor element may be utilized whose speed-torque relation, represented by the line QS, may be a considerably greater value, and the torque may become a value represented by the line VR because the coupling or lost motion connection absorbs the shock of carrrying the magnet over from one pole to another and exerts a stabilizing action to prevent carrying the rotor above synchronous speed. The value of such a device to cause the motor to reach synchronous speed and furnish additional power without losing synchronism is obvious.

Even if the rotor were to be carried above synchronous speed by external means the flexible or frictional coupling or lost motion connection exerts a stabilizing action, which automatically returns the rotor to synchronous speed when the external forces which carried the rotor above synchronous speed are removed.

It is apparent that the invention may be subjected to considerable modification without departing from the spirit and scope thereof, for instance a permanent magnet has been shown and described as one element of the rotor as a preferred construction but if desired this rotor element might be magnetically energized by means of a coil about the element electrically energized by direct current conducted to it through slip rings. Separate windings might be used for energizing the shifting and alternating fields. These and other modifications may be made without departing from the spirit and scope of the invention as set forth in the appended claims.

We claim as our invention:

1. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, and a rotor structure responsive to the magnetic fields in said two air gaps.

2. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, means creating a revolving magnetic field in one of said air gaps, and rotor means responsive to the magnetic fields in both of said air gaps.

3. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, one of said sets having a greater number of pole pieces than the other, and a rotor structure responsive to the magnetic fields in said two air gaps.

4. In a self-starting synchronous motor, the combination of a stator structure comprising a first set of cooperating pole pieces defining therebetween a first air gap and a second set of cooperating pole pieces defining therebetween a second air gap, said two sets of pole pieces being concentric, said stator structure connecting said two sets of pole pieces in series relation whereby flux threading said stator structure passes through said two air gaps in series relation, means for creating a magnetic flux in said stator structure, means creating a revolving magnetic field in said first air gap, said second set of pole pieces having a greater number of pole pieces than said first set, and a rotor structure responsive to the magnetic fields in said two air gaps.

5. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, and a rotor structure comprising two rotor elements movable relatively to each other, one responsive to the magnetic field in one air gap and the other responsive to the magnetic field in the other air gap.

6. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, and a rotor structure comprising an induction rotor element and a synchronizing rotor element responsive to the magnetic fields in said two air gaps.

7. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, one of said sets of pole pieces having a greater number of pole pieces than the other, and a rotor structure comprising two relatively rotatable rotor elements, one responsive to the magnetic field in one air gap and the other responsive to the magnetic field in the other air gap, and lost motion coupling means operatively coupling said rotor elements together.

8. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, and a rotor structure responsive to the magnetic fields in said two air gaps, and comprising a permanently magnetized rotor element.

9. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, means creating a revolving magnetic field in said first air gap, and a rotor comprising an element having induction motor characteristics responsive to the magnetic field in said first air gap, and a permanently magnetized element running as a synchronous element in response to the magnetic field in said second air gap.

10. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, shading means coacting with said first set of pole pieces for creating a revolving magnetic field in said first air gap, said second set having a greater number of pole pieces than said first set and creating a substantially stationary axis alternating magnetic field in said second air gap, and a rotor structure comprising an element responsive to the rotating magnetic field in said first air gap and having induction motor characteristics, and a permanently magnetized element running as a synchronous element in response to the substantially stationary axis alternating magnetic field in said second air gap, said induction and synchronous rotor elements being capable of relative rotation, and lost motion coupling means operatively coupling said rotor elements together.

11. In a self-starting synchronous motor, the combination of a stator structure comprising a first set of cooperating pole pieces at one end thereof defining therebetween a first air gap and a second set of cooperating pole pieces at the other end thereof defining therebetween a second air gap, said stator structure connecting said two sets of pole pieces in series relation whereby flux threading said stator structure passes through said two air gaps in series relation, means for creating a magnetic flux in said stator structure, and a rotor structure responsive to the magnetic fields in said two air gaps.

12. In a self-starting synchronous motor, the combination of a stator structure comprising an outer set of cooperating pole pieces defining therebetween an outer air gap and an inner set of cooperating pole pieces defining therebetween an inner air gap arranged substantially concentrically with respect to said outer air gap, means for creating a magnetic flux in said stator structure, and a rotor structure comprising outer and inner rotor elements responding to the magnetic fields of said outer and inner air gaps, said outer rotor element embracing said inner rotor element.

13. In an electric motor, a stator including a magnetic core and a pair of cup-shaped extensions at the ends of said core, teeth on the annular flanges of the respective extensions arranged in side by side relation to constitute a set of cooperating pole pieces, said stator also including members constituting a second set of cooperating pole pieces, and a rotor mounted for rotation with respect to said stator, comprising a permanent magnet and an induction element mounted for independent rotation with respect to each other, and lost motion means for coupling the two rotor elements together.

14. In an electric motor, a stator including a magnetic core and a pair of cup-shaped extensions at the ends of said core, teeth on the annular flanges of the respective extensions arranged in side by side relation to constitute a set of pole pieces, and one of said extensions comprising two spaced members of substantially circular toothlike conformation defining an air gap therebetween.

15. In a synchronous motor, the combination of means creating an alternating magnetic field comprising inner and outer annular elements of magnetic material concentrically disposed, the outer annular element having a ring of polar teeth projecting radially inwardly therefrom, the inner annular element having a ring of polar teeth projecting radially outwardly therefrom, both rings of teeth being disposed substantially in a common plane transverse to the axis of rotation of the rotor and in spaced relation with the teeth of one annular element nesting in alternating sequence between the teeth of the other annular element, a permanently magnetized rotor element revolving concentrically relatively to said rings of teeth and comprising rotor pole pieces revolving in a plane spaced laterally from the plane in which said rings of teeth are disposed, means connecting with said annular elements completing a magnetic circuit for said alternating magnetic field, and a coil for creating flux in said magnetic circuit.

16. In a synchronous motor, the combination of means creating an alternating magnetic field comprising two annular elements of magnetic material concentrically disposed, each of said annular elements having a ring of polar teeth projecting therefrom, both rings of teeth being spaced from each other but disposed in close proximity to each other with the teeth of one annular element arranged in alternating sequence with the teeth of the other annular element, a synchronous rotor element revolving concentrically relatively to said rings of teeth and comprising rotor pole pieces rotating in a plane spaced laterally from the plane of said rings of polar teeth, means connecting with said annular elements completing a magnetic circuit for said alternating magnetic field, and a coil for creating flux in said magnetic circuit.

17. In an alternating current motor, a stator having salient pole pieces, a rotor comprising a cup-shaped member arranged to extend over the pole pieces of the stator, and having a band of magnetic material secured on the outside of the flange of the rotor to constitute a part of the magnetic circuit of the stator.

18. In an electric motor, a stator structure having pole pieces arranged in annular side by side relation, and a rotor including a cup-shaped member embracing the pole pieces of said stator structure, said cup-shaped member being of magnetic material having a ring of electrically conductive but non-magnetic material disposed on the annular flange of the cup-shaped member.

19. An electric motor comprising a stator having a magnetic core provided with an opening therethrough and including extensions projecting outwardly from said core and carrying a plurality of pole pieces, and a rotor comprising a rotatably mounted shaft extending through the opening in said core and including an induction element on one end of said shaft, and a synchronizing element on the other end of said shaft.

20. An electric motor comprising a stator having extensions at each end thereof projecting outwardly and then in side by side axially-extending relation to form a plurality of pole pieces, and a rotor including a synchronizing element and an induction element, one of which elements is inside the pole pieces so formed and the other outside the pole pieces.

21. An electric motor comprising a stator having extensions at each end thereof projecting outwardly and then in side by side axially-extending relation to form a plurality of pole pieces, and a rotor including a synchronizing element outside the pole pieces so formed and an induction element inside the pole pieces.

22. In a self-starting synchronous motor, the combination of a stator structure comprising an outer set of cooperating pole pieces defining therebetween an outer air gap and an inner set of cooperating pole pieces defining therebetween an inner air gap arranged substantially concentrically with respect to said outer air gap, pole pieces of said outer set embracing pole pieces of said inner set, means for creating a magnetic flux in said stator structure, and a rotor structure comprising outer and inner rotor elements responding to the magnetic fields of said outer and inner air gaps.

23. In a self-starting synchronous motor, the combination of a stator structure comprising a cylindrical shell extending substantially axially of the motor, a first set of cooperating pole pieces associated therewith adjacent to one end of said shell and defining therebetween a first air gap, a second set of cooperating pole pieces associated with said shell and defining therebetween a second air gap, an energizing coil disposed substantially axially within said cylindrical shell and creating a magnetic flux passing through said cylindrical shell and through said first and second air gaps, means for creating a revolving magnetic field in one of said air gaps, and a rotor structure comprising an induction rotor element and a synchronizing rotor element responsive to the magnetic fields in said two air gaps.

24. In a self-starting synchronous motor, the combination of a stator structure comprising a cylindrical magnetic shell extending substantially axially of the motor, an enerigzing coil disposed substantially axially within said cylindrical shell, a synchronizing rotor element, a group of stator pole pieces associated with said cylindrical shell adjacent to one end thereof and energized by said coil, a group of rotor pole pieces associated with said rotor, the pole pieces of one of said groups having spaces therebetween of a width spanning the width of at least one of the pole pieces of the other group, a second group of stator pole pieces associated with said shell and energized by said coil, means cooperating with said latter group of pole pieces for creating a revolving magnetic field, an induction rotor element responsive to said revolving magnetic field, and means establishing an operative connection between said rotor elements.

25. In a self-starting synchronous motor, the combination of a stator structure comprising a cylindrical magnetic shell extending substantially axially of the motor, an energizing coil disposed substantialy axially within said shell, a set of stator pole pieces associated with said shell and energized by said coil, a permanently magnetized rotor element, a set of rotor pole pieces on said permanently magnetized rotor element cooperating with said set of stator pole pieces, one of said sets of pole pieces including spaces between adjacent pole pieces whereby successive pole pieces of said latter set will register with alternate pole pieces of the other set, a second group of stator pole pieces associated with said cylindrical shell and energized by said coil, means cooperating with said latter group of pole pieces for creating a revolving magnetic field, an induction rotor element responsive to said revolving magnetic field, and means establishing an operative connection between said rotor elements.

FREDERICK C. HOLTZ.
FRED KURZ.